United States Patent [19]

Kaplan

[11] Patent Number: 5,732,180
[45] Date of Patent: Mar. 24, 1998

[54] METHOD AND APPARATUS FOR SEALING FIBER OPTIC ENTRYWAYS TO A SEALED ENCLOSURE

[75] Inventor: Steve E. Kaplan, Elyria, Ohio

[73] Assignee: Multilink, Inc., Elyria, Ohio

[21] Appl. No.: 489,026

[22] Filed: Jun. 9, 1995

[51] Int. Cl.[6] .................................................. G02B 6/36
[52] U.S. Cl. ............................................. 385/135; 385/138
[58] Field of Search ................................... 385/134–139

[56] References Cited

U.S. PATENT DOCUMENTS

| | | | |
|---|---|---|---|
| 5,280,556 | 1/1994 | Jones | 385/139 |
| 5,426,715 | 6/1995 | Moisson et al. | 385/139 X |
| 5,446,823 | 8/1995 | Bingham et al. | 385/135 |
| 5,450,518 | 9/1995 | Burek et al. | 385/135 |
| 5,509,099 | 4/1996 | Hernsen et al. | 385/134 |
| 5,519,804 | 5/1996 | Burek et al. | 385/135 |

*Primary Examiner*—John D. Lee

[57] ABSTRACT

A clamping apparatus is positioned adjacent the interior wall of a sealed compartment. The wall has an opening providing an entryway for a fiber optic cable to the interior of the compartment. The clamping apparatus applies compression forces to an annular cylindrical body of a flexibly resilient and deformable grommet supported in line with the opening to seal the opening. The grommet has a passageway for the cable. The clamping apparatus, which essentially surrounds and conforms to the annular body of the grommet, is operable to compress the grommet radially around the cable and to axially urge the end face against the wall of the opening. A clamp member having clamping surfaces for compressing two side by side grommets in line with two side by side cable openings in the wall is disclosed. A headed rod extending at an angle to the wall with the cable openings therein supports the clamp member for angled movement to effect the compressive radial and axial forces.

14 Claims, 3 Drawing Sheets

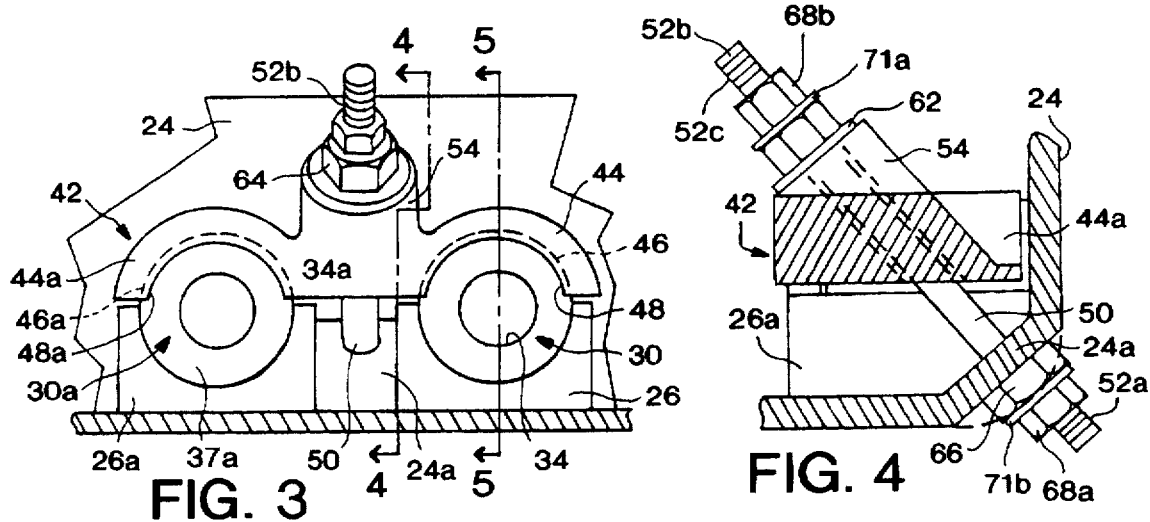
FIG. 3
FIG. 4
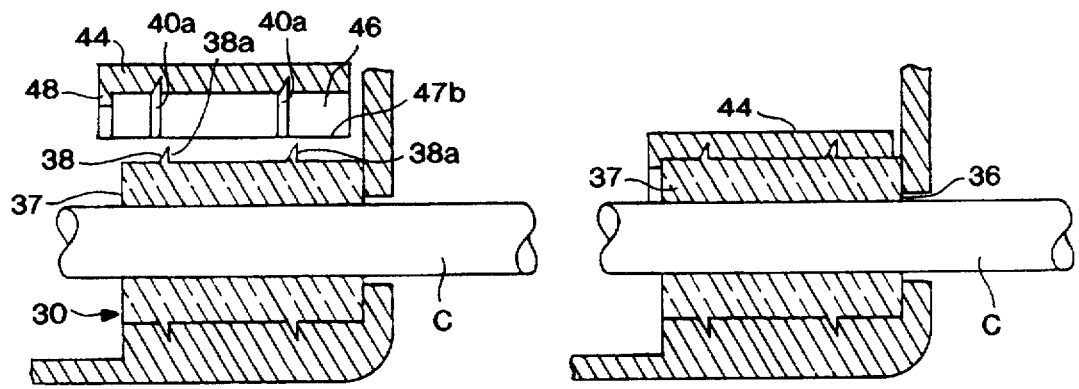

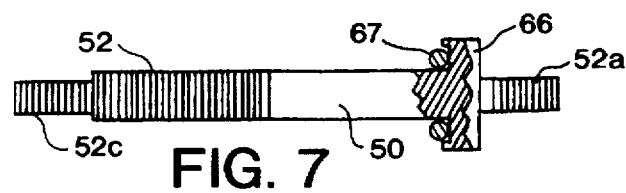
FIG. 7

METHOD AND APPARATUS FOR SEALING FIBER OPTIC ENTRYWAYS TO A SEALED ENCLOSURE

The present invention relates to a method and apparatus for sealing entryways for fiber optic cables in an enclosure for connections between or to fiber optic cables, particularly to connections in a fiber optic transmission line, such as splices between fiber optic sections, separated fibers for cable drops or a rider optic cable sub-division for a portion of a network, and especially to fiber optic aerial transmission systems for communication signals.

Although the present invention will be specifically described with respect to an aerial transmission system, it is may be useful in other types of fiber optic cable systems, such as underground installations, as will be understood by those skilled in the art from the description of the invention set forth herein.

In fiber optic transmission systems, an enclosure is used to enclose splices to protect them from environmental conditions; particulary moisture. An enclosure frequently used has an open top compartment which is closed by a sealed cover to provide an interior space which is protected from adverse environmental conditions.

To provide for entry of fiber optic to the interior space, a wall or walls of the interior space are provided with entryways in the form of cable openings through which the fiber optic cable passes to the interior space. Heretofore, various means have been used to seal or close of the clearance space in the opening between the cable exterior and the peripheral edges of the entryway opening.

It is an object of the present invention to provide a method and apparatus for easily and effectively sealing a cable opening through which a cable passes into the interior space of an enclosure by establishing radially and axial compression forces in an annular body of a grommet of resiliently deformable material, such as rubber, which is adjacent the opening and which is resiliently urged against the wall area around the opening to cover and seal the clearance space around the cable.

It is a further object to provide such a method and apparatus in which various size cables to be accommodated by a cable entryway to the interior space of an enclosure can be sealed by using a simple apparatus mounted adjacent the opening for compressing a predetermined size sealing member with a passageway through the member being varied for the particular cable size.

SUMMARY OF INVENTION

The method and apparatus of the present invention involves a method and apparatus for providing a resilient seal for a fiber optic cable which enters an interior space through a cable opening in an exterior wall for the space. The apparatus comprises clamp means immediately adjacent the cable opening for compressing a sealing in the form of a grommet having a cylindrical annular body of a resiliently flexible and deformable material. The grommet has an end face larger than the cable entry opening so as to be engageable with the wall area around the opening. The annular body of the grommet defines an axially extending passageway for the cable and the clamp means comprises a pair of opposed clamp members. Each of the clamp members have a cylindrically concave surface for receiving approximately 180° of the annular body of the grommet with the surfaces having essentially the same radius of curvature as the exterior of the annular body of the grommet. The concave surfaces of each clamp member terminate at longitudinal edges opposing the edges of the other of the other clamp member, with clamp members essentially defining the exterior of a cylinder with a gap between clamp members to allow movement of clamp members toward each other.

The clamp members are mounted for relative movement along an angular path to apply deforming forces to the outside surface of annular body of the grommet to compress the resilient material of the grommet and urge the material around the cable and against the wall of the cable opening to provide an environmental seal around the cable and the wall opening.

In accordance with a feature of the invention, operation of the clamp means applies compressive forces to the outside surface of the grommet and establishes a force component resiliently urging the material of the grommet radially around the grommet and axially toward and against the wall of the cable opening to effect a resilient seal around the periphery of said opening.

To establish the component forces, the clamp means is operated to move on clamp member toward the other along a path angled to the axis of the annular body of the grommet to establish and maintain radial compressive forces acting on exterior of the grommet and axial forces resiliently and flexibly urging the end face of the grommet body grommet axially against the wall of the cable opening to from a seal around the periphery of the opening. In the preferred embodiment, the clamping forces are established by a nut on an angled threaded rod which is turned to effect movement of one of the clamp members along the rod, the threaded rod extending at an acute angle to the wall and the plane of the gap between the clamp members.

The present invention also enables a single clamping operation to be performed for side by side cables entering the interior space through side by side openings in an exterior wall of the space. Stationary clamp members in the form of side by side grommet supports are associated with respective opening, and each has a cylindrically concave surface for receiving approximately one half the length of the radial circumference of the annular body of a respective grommet mounted on a cable passing through the respective wall opening. The concave surfaces of the stationary clamp members, or grommet supports, are opposed to a single moveable clamp member having side by side cylindrically concave surfaces matching those of the grommet supports and opposing a respective one of the grommet supports to cover approximately one half of the radial circumference of the length of the annular body of respective grommet. The moveable clamp member is moved angularly as previously described to simultaneously establish component compressive forces, radially and axially, in each grommet to grip the cable therein and to seal around the respective cable and respective wall openings. The flexible resiliency of the grommets and tolerances in the clamping mechanism will accommodate the use of a single clamp member to establish the necessary forces on and in each of the grommets.

Grommets of identical exterior configuration and size but with different diameter cable passageways may be utilized in the grommet supports to accommodate different size fiber optic cables which might be used.

DESCRIPTION OF THE DRAWINGS

Referring to the drawings which are illustrative of a preferred embodiment of the present invention and which constitute a part of this specification for all subject matter shown therein:

FIG. 3 is a fragmentary front plan view of the bottom compartment shown in the exploded FIG. 2 with the elements of FIG. 2 shown in an assembled condition.

FIG. 4 is a cross sectional view taken along line 4—4 of FIG. 3;

FIG. 7 is a view of a bolt-like rod used in the apparatus shown in the drawings.

DESCRIPTION OF THE INVENTION

Figure 1:
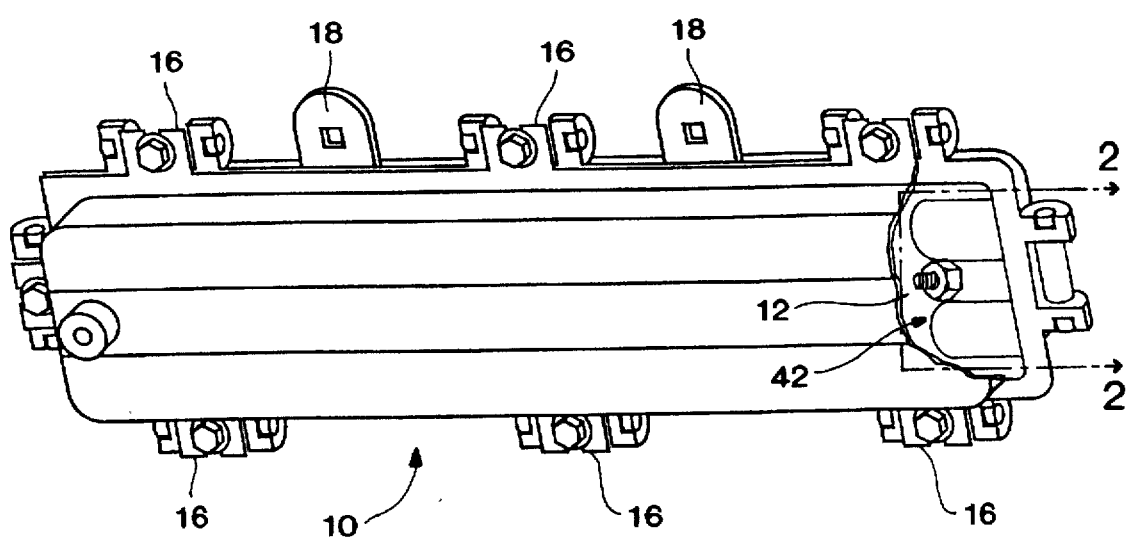
FIG. 1 is a perspective view of a splice enclosure embodying the present invention.

FIG. 1 illustrates an aerial splice enclosure 10 having an open top compartment 12 and a removable cover 14. The cover is clamped into sealing engagement against a gasket around the top of the bottom compartment by bolt type devices 16 to form a sealed enclosure to protect the interior space of the enclosure from the environment, particularly moisture from rain, snow, or ice. The enclosure has side projections 18 for conventionally hanging the enclosure from an overhead wire cable with a conventional wire clamp (not shown) connected to each projection 18. In conventional aerial fiber optic systems, the fiber optic cable is tied along its length to the wire cable.

The sealed enclosure as thus far described is only the environment of the present invention and is well within the ability of those skilled in the art. The invention does not involve the structure of providing a sealed compartment from the standpoint of the sealing between the cover and an open top compartment, but involves the manner of sealing a wall through which a fiber optic cable enters the interior of the sealed enclosure, particularly such a wall in an aerial system where the enclosure is suspended from a wire cable.

Figure 2:
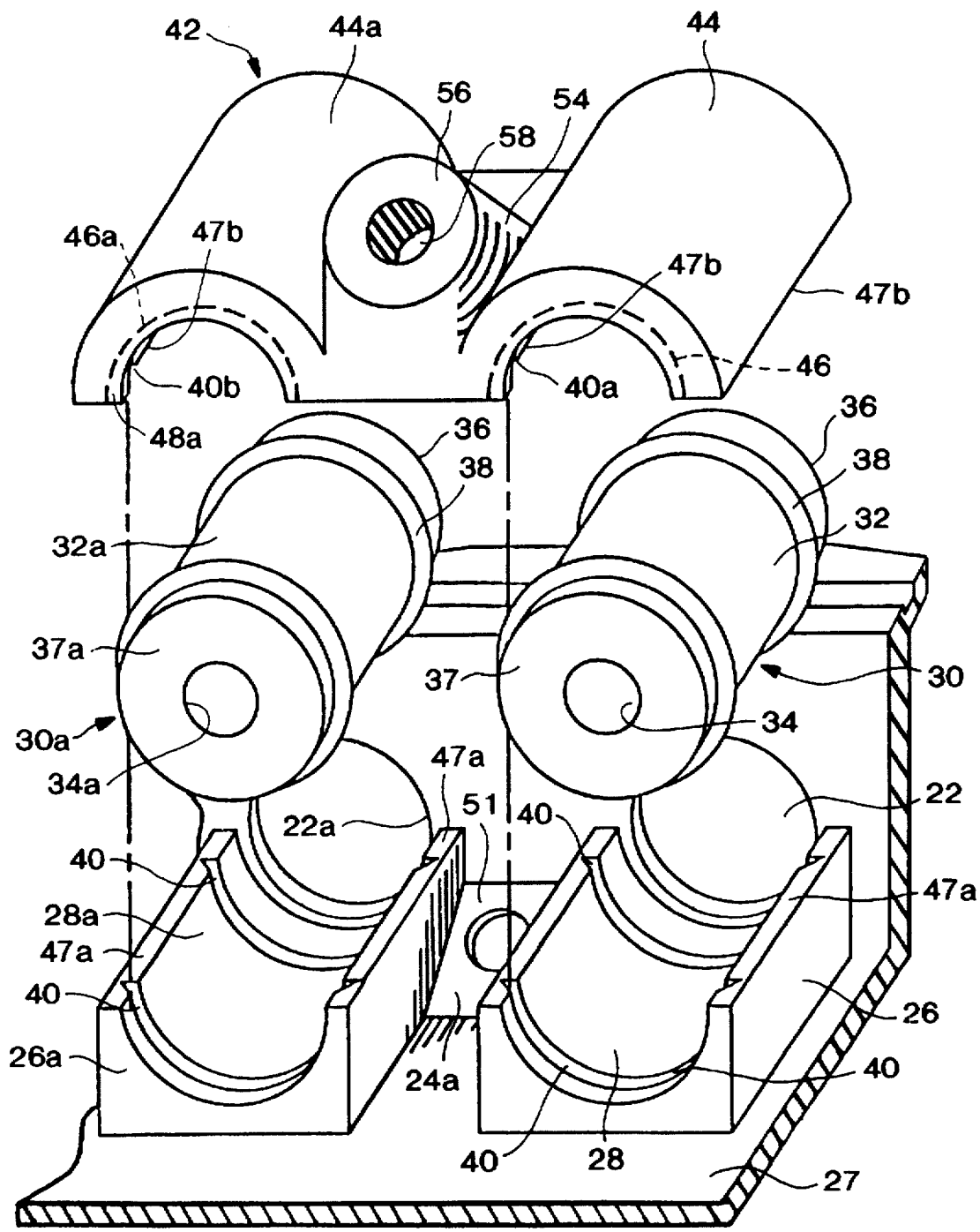
FIG. 2 is an exploded fragmentary view of parts at one end of the splice enclosure of FIG. 1, the view being taken along line 2—2 of FIG. 1.

As illustrated in FIG. 2, an end wall of the open top compartment 12 has side-by-side cable openings 22, 22a in an end wall 24 of the bottom compartment 12 for entry of cables into the interior space of the enclosure. It will be understood that the enclosure itself, under the broader concepts of the present invention, may be of metal, but a molded plastic enclosure is preferred and the description will proceed based on a molded plastic structure for the bottom compartment and the cover. This provides a relatively inexpensive structure for the bottom compartment and the cover, the molding and construction thereof being within the conventional skill of those in the art.

Referring to FIG. 2, the enclosure has stationary clamp members in the form of grommet supports 26, 26a, one adjacent each of the cable openings 22, 22a in the end wall 24 of the compartment 12.

The grommet supports, as disclosed, are integrally molded with the floor 27 and the wall 24 of the compartment 12. Each of the grommet supports 26, 26a has a concave cylindrical surface 28 for supporting respective one of grommets 30, 30a. The concave surfaces 28 face away from the floor and extend inwardly of the compartment 12 from the wall 24 below a respective one of the openings 22, 22a. The axis of curvature of the surfaces 28 being aligned with the center of the respective one of the openings 22, 22a, i.e., the surfaces 28 have a radius of curvature which is the distance from the center of its respective opening to the respective surface 28 below the opening.

Figure 5:
FIG. 5 is fragmentary cross view taken along line 5—5 of FIG. 3 showing a cable and grommet in place and a clamping member in a raised position from its clamped position.

The grommets 30, 30a, are of a resiliently flexible material and comprise respective cylindrical annular bodies 32, 32a each with respective axially extending cable passageways 34, 34a extending therethrough, the axis of each passageway being substantially in alignment and coaxial with the fiber optic transmission cable C entering the compartment through the respective one of the openings 22, 22a and the corresponding grommet (See FIG. 5).

Figure 6:
FIG. 6 is a view corresponding to FIG. 5 but with the clamp member in a clamping position.

The grommets 30, 30a have end faces 36, which are positioned immediately adjacent or against the wall 24, each end face 36 being of a size to cover the respective one of the openings 22, 22a and to overlap the periphery of the respective opening to engage and bear against the area of wall 24 around the periphery of the respective opening as is best shown in FIGS. 5 and 6. The grommets in the preferred embodiment also have circular end faces 37 at their inner ends as best shown in FIG. 2. The end faces 36: are of the same configuration as that shown for the end faces 37.

The grommets 30, 30a have, in the accordance with the preferred embodiment, two axially spaced sealing and locating ridges 38 which circle and radially project from the outer cylindrical surface of the grommet, one being located inwardly of each end of the grommet as shown in FIG. 2. The sealing ridges 38 are coaxial with the respective grommet and each ridge has an inverted V-shape with one side 38a (see FIG. 5) of the inverted V lying in a plane perpendicular to the axis of the grommet and the other at an angle, for example, about 45° to a plane perpendicular to the axis of the grommet, the sides 38a facing the same the end of each grommet, the end which is to be positioned against the end wall 34, i.e., the end face 36.

The cylindrical surfaces 28 of the grommet supports each have circular V-shaped groves 40 for receiving the inverted V-shaped ridges with the groves being the complement of the ridges 38, with the sides 38a of the grommet facing the end wall 24. The groves of the respective cylindrically concave surfaces 28 are located so that a grommet positioned on a grommet support 26 or 26a has its end face 36 immediately adjacent or contiguous to the wall 24.

In the preferred embodiment, the grommet supports 26, 26a cooperate with a movable clamping member 42 to create radial compressive forces to urging the resiliently flowable material of the grommets around the cables passing therethrough and axial forces urging the grommets into sealing engagement with the wall 24.

The clamping member 42 has clamping portions 44, 44a disposed above the grommet supports 26, 26a, respectively, as the supports are viewed in the drawings. The clamping portions 44, 44a are cylindrically curved to provide cylindrically curved concave surfaces 46, 46a for receiving and engaging the exterior surfaces of the annular body 32 of grommets 30, 30a. As is best shown in FIG. 5, with respect to the clamping portion 44, the concave surface 46 thereof is a mirror image of the cylindrically curved surface 28 of the grommet support 26. Similarly the concave surface 46a of the clamping portion 44a is also a mirror image of the surface 28 of the grommet support 26a. The mirror images of the clamping portions include grooves 40a which, when the clamp member is clamping position, see FIGS. 3 and 6, form continuations of the corresponding grooves 40 in the opposed grommet supports 26, 26a. Each of the concave surfaces 28 of a respective grommet support and its opposing mirror image surface 46 or 46a on the opposing clamping portion 44 or 44a terminate in opposing axially extending edges 47a on the grommet supports and 47b on the clamping portions 44, 44a which oppose the edges 47a on the opposing groom support. The concave cylindrically curved surface 28 on each grommet support 26, 26a, and its respective opposing concave cylindrically curved surface 46 or 46a on the opposing clamping portion 44 or 44a essentially define a cylinder conforming to the cylindrical annular body of the grommet to be received therebetween, but with a gap between the respective opposing edges 47a, 47b to allow relative grommet deforming movement between the grommet support and the opposing clamping portion on the clamp member 42.

The clamping portions 44, 44a also have inner flanges 48, 48a for engaging the adjacent inner end face 37 of the respective grommet 30, 30a.

The clamping member 42 is movably supported on a rod 50. The rod 50, as best shown in FIGS. 3 and 4, has threaded end portions 52a and 52b and extends from the outside of the wall 24 through an opening 51 (See FIG. 2) in an inset canted wall portion 24a at the base of the wall 24. The threaded end portion 52a of the rod protrudes outwardly of the canted wall 24a, the rod 50 extending upwardly from the canted wall through a hollow boss 54 of the clamping member 42. The boss 54 is between the clamping portions 44, 44a and has an end wall 56 at its inner end with an opening 58 (see FIG. 2) through which the threaded end portion 52b of the rod protrudes. In the preferred embodiment, the canted wall 24a has an angle of about 45° between the wall 24 and the floor 27 of the compartment 12 and the rod 50 extends perpendicularly to the canted wall 24a and at an angle of about 45° to the floor 12a of the compartment 12.

The rod opening 58 in the end wall 56 of the boss 54 is large enough to provide a loose fit for the rod 50 in the clamping member 42 so as to provide play between the rod and clamping member 42 so as to allow the clamping member 42 to adjust itself on the rod to seat properly around the grommets nesting in the grommet supports 26, 26a.

It will be understood that the enclosure 10 as manufactured may have, for example, provisions for multiple cable entries in two or more walls. This provides flexibility as to the type of connections which can be made in the enclosure. For example, a fiber optic cable may enter one end of the enclosure and exit the other end, with fiber being separated from the cable for splicing to a cable drop with the cable drop entering the enclosure through the second cable opening in one of the end walls.

As manufactured, the cable entry openings of the enclosure are molded with knockouts. Since the knockouts for the cable openings to be used are the only ones punched out, only these need sealing. Thus, if only one cable is to enter through the end wall 24, say through the cable opening 22a, cable opening 22 would be closed by its molded knockout and would need no sealing but would preferably have a grommet 30 in place in the grommet support 26 to facilitate the seating of the clamping member 42 around the grommet 30a in the grommet support 26a.

The rod 50 is shown (FIGS. 3 and 4) with a washer 62 between the end wall 56 of the boss 54 and a clamp nut 64 on the threaded end portion 52b. At the opposite end of the rod, threads of the rod end portion 52a extend inwardly from the end of the rod to an hexagonal head 66 which is integral with the rod and functions as a bolt head for the rod, i.e., a bolt extending from the wall 24a with a threaded end portion 52b protruding from the boss 54. The inner face of the bolt head 66 is circularly recessed about the rod to receive an O-ring 67 to effect a seal against the wall 24a around the rod opening 51.

The threaded rod portion 52b of the rod 50 having the clamp nut 64 thereon comprises a threaded stem portion 52c extending outwardly from a threaded portion 52d for the nut 64, the threaded stem portion 52c preferably having an outside diameter smaller than the outside diameter of the threaded portion 52d to allow the nut 64 to freely pass over the threads of the stem portion 52c to the threaded portion 52d for the nut. Grounding nuts 68a, 68b may be respectively threaded onto the threaded portions 52a, 52c to clamp ground connecters to the outer ends of the rod, the threaded end portion 52a for the nut 68a preferably having the same outside diameter as the threaded stem portion 52c.

To bring cables into the enclosure through the openings 22, 22a, the knockouts (not illustrated) for the openings are punched out and the clamp member 42 is removed by backing off the nuts 64, 68b. Grommets 30, 30a of the having the proper size having the proper size passageways 34, 34a for the cables are selected, and the fiber optic cables are drawn through the respective passageways and the grommets are moved along the cables and seated into the respective grommet supports 26, 26a. After the seating of the grommets, the clamping member 42 is placed on the rod 50 and moved into engagement with the grommets. FIG. 5 illustrates a position of the clamp member before its engagement with the grommet 30 while FIG. 6 illustrates the clamp member in full engagement clamping engagement with the grommet. As illustrated in FIG. 6, the grommets protrude from the side of the clamp member 42 adjacent the wall 24 so that the ends of the grommets may resiliently compress against the wall 24 to seal the openings therein.

When the clamping member 42 is in clamping engagement with the grommets 30, 30a, the clamp nut 64 is threaded onto the threaded end portion 52, usually after the clamping member has been seated by hand with the rod pulled inwardly of the enclosure to engage the head 66 and the sealing washer therein with the outside face of the canted wall 24a. The nut may be wrenched to deform the clamping member to establish the necessary radial and axial compressive forces for urging the material of the grommet around the cables and into sealing engagement with the wall 24. The end flanges 48 of the clamping member 42 engage the inner end faces 37 of the respective grommets 30, 30a to trap the inner ends of the grommet and urge the resilient material of the grommet axially to urge the end faces 36 of the grommets against the end wall 24. It will also be understood that the radial compression forces will have an axial component which acts to produce a sealing engagement of the end face 37 with the wall 24.

The radial force components cause the resilient deformation of the passageways 34, 34a about the cables extending through the respective grommets and to urge the ridges 38 into the grooves with the ridges being resiliently yieldable in response to the axial forces to effect a sealing engagement at the bases of the respective ridges between the outward sides 38a of the respective ridges and their receiving grooves 40, 40a.

After the clamping nut has established the sealing forces in the resilient grommet bodies, grounding nuts 68a 68b, with washers 71a, 71b, may be threaded onto the respective ends 52a, 52b of the rod 50 to effect the connection of grounding wires (not illustrated) to the ends of the rod, thus eliminating the necessity of providing another opening in the walls of the enclosure to provide a grounding connection. Such grounding connections are conventional and from the structure herein described, one of ordinary skill in the art can readily make the grounding connections in a conventional manner using the illustrated nuts 68a, 68b and the washers 71a, 71b on the threaded portions the rod.

In the preferred embodiment, the threaded rod portion 52b of the rod 50 preferably has an outer threaded portion 52c for the grounding nut 70b and washer 71b with the portion 52c having a reduced outside diameter as compared to the diameter of the threaded portion inwardly thereof for the clamping nut 64. The preferred diameter for the threads for nut 64 is the outside diameter of the rod 50. The threaded end portion 52a of the rod protruding outside of the wall 24a may have the same outside diameter as the outer threaded portion 52c so that the same size grounding nuts and washers can be used at each end of the rod.

It will be further noted that the present invention readily accommodates various size cables up to a maximum size cable, i.e., one capable of being hand drawn through the openings 22, 22a. Various size cables are accommodated by having grommets with a cable passageway 34 which approximates the diameter of the cable to be used. Except for the size of the cable passageway the grommet is otherwise the same as those for a different size cable. This allows a workman to have with him the particular grommets needed for any size of cable which is to enter an enclosure for connections to or between cables.

It will be further understood that the exterior of the fiber optic cable is relatively smooth, but that the compression of the grommet and the ridges 38 will effectively seal variations in the smoothness of the jackets.

The flexible resilient grommet is of rubber or equivalent material which is resiliently flexible and deformable so that the clamp member can establish and maintain the necessary sealing forces. Preferably the grommets are of EPDM rubber, a type well known to those in the art of flexibly resilient rubber.

What I claim is:

1. In an enclosure for a fiber optic cable transmission line splice connection, a wall having a first opening therein as an entryway for a cable to the interior of said enclosure, said enclosure having clamping means mounted immediately adjacent said wall for applying compression forces to substantially the whole cylindrical periphery of a cylindrical annular body of a grommet of resiliently deformable and flexible material which surrounds a cable entering said opening and for urging the grommet axially into engagement with said wall to seal the entryway into the enclosure, said clamping means comprising grommet support means having a first grommet support adjacent said opening, said grommet support having a concave cylindrically curved portion conforming to the curvature of the annular body of the grommet for receiving the grommet, and a movable clamp member having a corresponding concave cylindrically curved portion for engaging and compressing the grommet against said grommet support and axially against said wall around the periphery of said opening, said clamping means comprises means for supporting said clamp member in opposing relationship to said grommet support means, said means for supporting said clamp member comprising means supporting said clamp member for movement along an angled path toward said grommet support means and said wall to compress the grommet and means for moving said clamp member to compress the grommet and hold it in a clamped position to maintain compression on the grommet.

2. In an enclosure for a fiber optic cable transmission line splice connection, the structure as defined in claim 1 in which said wall has a second opening therein as a second cable entryway into said enclosure, said second opening being along side said first opening and said grommet support means comprising a second grommet support adjacent said opening and along side said first grommet support, said second grommet support having a concave cylindrically curved portion conforming to the curvature of the annular body of a second grommet for receiving the second grommet and said movable clamp member having a second concave cylindrically curved portion having the curvature of the annular body of said second grommet for engaging and compressing the second grommet against the second grommet support to seal along the cable therein and axially against said wall around the periphery of said second opening to seal said second opening.

3. In an enclosure for a fiber optic cable transmission line splice connection, the structure as defined in claim 2 in which each said opposing concave surfaces extend approximately 180° around the radial circumference of the grommet to be clamped therebetween, each said opposing surfaces defining a cylinder conforming to the exterior of a grommet to be clamped with a gap between the opposing surfaces with said gap lying along a diametrical plane of the defined cylinder.

4. In an enclosure for a fiber optic cable transmission line splice connection, the structure as defined in claim 3 in which said means for supporting said clamp member comprises a headed rod extending angularly from said wall through said clamp member to support said clamp member for movement toward said grommet support means and said wall.

5. In an enclosure for a fiber optic cable transmission line splice connection, the structure as defined in claim 3 in which each said cylindrically concave surfaces opposing each other have V-shaped grooves therein for receiving annular ridges on the annular body of a grommet therebetween.

6. In an enclosure for a fiber optic cable transmission line splice connection, the structure as defined in claim 2 in which said means for supporting said clamp member comprises a headed rod extending angularly from said wall through said clamp member to support said clamp member for movement toward said grommet support means and said wall.

7. In an enclosure for a fiber optic cable transmission line splice connection, the structure as defined in claim 1 in which said opposing concave surfaces extend approximately 180° around the radial circumference of the grommet to be clamped therebetween, said opposing surfaces defining a cylinder conforming to the exterior of the grommet to be clamped thereby with a gap between the opposing surfaces, said gap lying along a diametrical plane of the defined cylinder.

8. In an enclosure for a fiber optic cable transmission line splice connection, the structure as defined in claim 7 in which said means for supporting said clamp member comprises a headed rod extending angularly from said wall through said clamp member to support said clamp member for movement toward said grommet support means and said wall.

9. In an enclosure for a fiber optic cable transmission line splice connection, the structure as defined in claim 7 in said cylindrically concave surfaces opposing each other have V-shaped grooves therein for receiving annular ridges on the annular body of a grommet therebetween.

10. In an enclosure for a fiber optic cable transmission line splice connection, the structure as defined in claim 1 in which said means for supporting said clamp member comprises a headed rod extending angularly from said wall through said clamp member to support said clamp member for movement toward said grommet support means and said wall.

11. In an enclosure for a fiber optic cable transmission line splice connection, the structure as defined in claim 1 in which said cylindrically concave surfaces opposing each other have V-shaped grooves therein for receiving annular ridges on the annular body of a grommet therebetween.

12. In a splice enclosure which has an interior compartment which is to be sealed from the exterior environment, said compartment comprising an external wall having respective opposed first and second wall sides and a cable opening extending through said wall and wall sides for passing a cable between the exterior and interior of the compartment, and a grommet supporting and confining structure for supporting an elongated resiliently deformable annular grommet having first and second terminating annular end faces, one at each end thereof, and an axial cable passageway therethrough for the cable, said supporting and confining structure comprising grommet support means supporting said grommet axially in line with the center of said opening with said second end face of the grommet displaced outwardly away from said first wall side and said first end face disposed adjacent said first wall side and the opening therethrough whereby the grommet extends axially in a direction away from said first wall side to said second end face displaced from said first wall side, said supporting and confining structure having opposed confining surfaces extending away from said first wall side and axially along the grommet, said confining surfaces being cylindrically concave surfaces extending essentially the full length of the grommet for engaging essentially the full length of the outside cylindrical surface of the grommet, and grommet compression mechanism for establishing radial compression forces in the grommet for essentially the full length of the grommet between said confining surfaces to resiliently urge the interior of the grommet against the exterior of the cable passing through the grommet to provide a seal along the cable, said compression mechanism comprising a compression member engageable with said second end face of the grommet for compressing and bodily urging the grommet axially toward said first side of said wall to effect axial components in the grommet to compress and resiliently urge said first end face of the grommet against said first wall side around the outer periphery of said cable opening to effect a sealing of said cable opening between said first wall side and the grommet.

13. In an enclosure for a fiber optic cable transmission line splice connection as defined in claim 12 in which said compression mechanism comprises relatively rotatable elements for establishing compression forces in the grommet to compress the grommet between said surfaces and to urge the grommet bodily toward said first wall side, said relatively rotatable elements being operatively connected to said member to urge the grommet toward said first wall side to compressingly urge the said first end face of the grommet into sealing engagement with said first wall side of said wall.

14. In an enclosure for a fiber optic cable transmission line splice connection as defined in claim 13 in which said elements are threaded elements.

* * * * *